US011648879B2

(12) United States Patent
Wuggetzer et al.

(10) Patent No.: US 11,648,879 B2
(45) Date of Patent: May 16, 2023

(54) MOVEMENT DEVICE WITH CLOSING ACTUATOR, LUGGAGE COMPARTMENT WITH MOVEMENT DEVICE, AND VEHICLE WITH LUGGAGE COMPARTMENT

(71) Applicant: Airbus Operations GmbH, Hamburg (DE)

(72) Inventors: Ingo Wuggetzer, Hamburg (DE); Jochen Werner, Hamburg (DE); Hendrik Segelhorst, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 56 days.

(21) Appl. No.: 17/209,316

(22) Filed: Mar. 23, 2021

(65) Prior Publication Data
US 2021/0300251 A1    Sep. 30, 2021

(30) Foreign Application Priority Data
Mar. 25, 2020 (DE) .......................... 102020108277.0

(51) Int. Cl.
*B60R 5/00*    (2006.01)
(52) U.S. Cl.
CPC .................. *B60R 5/003* (2013.01)
(58) Field of Classification Search
CPC ............... B60R 5/003; B64D 11/003
USPC ..................................................... 296/37.1
See application file for complete search history.

(56) References Cited

U.S. PATENT DOCUMENTS

| | | | | |
|---|---|---|---|---|
| 5,123,875 A * | 6/1992 | Eubank | ................... | F24F 7/025 236/44 C |
| 7,240,941 B2 * | 7/2007 | Adams | ...................... | B60R 7/06 49/386 |
| 7,638,962 B2 * | 12/2009 | Cardwell | ................ | F16P 3/141 318/443 |
| 9,878,791 B2 * | 1/2018 | Kammerer | ........... | B64D 11/003 |
| 10,626,660 B2 * | 4/2020 | Ikenori | .................... | E05F 15/71 |
| 10,780,980 B2 * | 9/2020 | Riedel | ..................... | B64F 1/368 |

(Continued)

FOREIGN PATENT DOCUMENTS

| | | | | | |
|---|---|---|---|---|---|
| AT | 200101653 A | * | 10/2002 | ............. | B60R 5/003 |
| CA | 2998192 A1 | * | 3/2017 | ............. | B64D 11/00 |

(Continued)

OTHER PUBLICATIONS

WO 047 machine translation (Year: 2013).*

*Primary Examiner* — Hilary L Gutman
(74) *Attorney, Agent, or Firm* — Greer, Burns & Crain, Ltd.

(57) ABSTRACT

A movement device for a luggage compartment flap having a mounting arm for the mounting of a luggage compartment flap. The movement device furthermore includes an actuator which is coupled to the second section the mounting arm and which is configured to, when activated, move the mounting arm such that the luggage compartment flap is moved at least part of the way from an open position to a closed position. As a result of this movement of the luggage compartment flap, the latter can be more easily reached and, for example, moved manually into its closed position. Also provided are a luggage compartment having a movement device, a vehicle region having a multiplicity of luggage compartments, and a vehicle having at least one movement device.

13 Claims, 3 Drawing Sheets

(56) References Cited

U.S. PATENT DOCUMENTS

| | | | |
|---|---|---|---|
| 10,900,269 B2 * | 1/2021 | Holzapfel | E05F 1/1075 |
| 2002/0121974 A1 * | 9/2002 | Ohara | E05B 47/0012 |
| | | | 340/541 |
| 2002/0175827 A1 * | 11/2002 | Klein | G08C 17/02 |
| | | | 340/4.11 |
| 2010/0127882 A1 * | 5/2010 | Sitarski | E05F 15/77 |
| | | | 340/686.1 |
| 2021/0299840 A1 * | 9/2021 | Sontag | B25F 1/00 |
| 2021/0301568 A1 * | 9/2021 | Schneider | E05C 3/008 |
| 2022/0203489 A1 * | 6/2022 | Schmid | B23Q 11/0092 |

FOREIGN PATENT DOCUMENTS

| | | | | |
|---|---|---|---|---|
| WO | WO-9008674 A | * | 8/1990 | B60Q 3/43 |
| WO | WO-2013113047 A1 | * | 8/2013 | E05F 1/1058 |
| WO | WO-2017075640 A1 | * | 5/2017 | B64D 11/00 |
| WO | WO-2021097599 A1 | * | 5/2021 | |

* cited by examiner

MOVEMENT DEVICE WITH CLOSING ACTUATOR, LUGGAGE COMPARTMENT WITH MOVEMENT DEVICE, AND VEHICLE WITH LUGGAGE COMPARTMENT

CROSS-REFERENCES TO RELATED APPLICATIONS

This application claims the benefit of the German patent application No. 102020108277.0 filed on Mar. 25, 2020, the entire disclosures of which are incorporated herein by way of reference.

BACKGROUND OF THE INVENTION

The present invention relates to a movement device for the partial movement of a luggage compartment flap, to a luggage compartment and to a vehicle region having a movement device and/or controller and to a vehicle having a movement device. In particular, the present invention relates to a movement device, luggage compartment, vehicle region and vehicle, the movement device comprising an actuator which moves a luggage compartment flap at least a part of the way in the direction of a closed position.

BACKGROUND OF THE INVENTION

In aircraft and some other means of mass transportation, such as, for example, ships, buses or trains, overhead luggage compartments are arranged in the region of the ceiling. The luggage compartments, which are normally provided above passenger seats, are open toward an aisle running adjacent to the seats and are closed by means of a flap. In the opened state of the flap, the free end thereof is situated in the ceiling region of the passenger cabin and thus high above the aisle.

Depending on the construction of the vehicle and/or the height of the passenger or of the member of service personnel, it can be difficult to reach the free end in order to close the flap. Therefore, in order to reach and close the luggage compartment flap, the person in question often climbs onto a step provided on a passenger seat, or even climbs fully onto the seat, in order to be able to grip the flap. This not only presents risks to the person in question but also requires a correspondingly stable construction of the seat, whereby this is made heavier.

SUMMARY OF THE INVENTION

The invention is therefore based on an object of providing easier closing of a luggage compartment flap and of providing a corresponding luggage compartment and an associated vehicle region and vehicle, which facilitate closing of the luggage compartment flap.

According to a first aspect for improved understanding of the present disclosure, a movement device for a luggage compartment flap comprises a mounting arm which is configured to be articulated at an articulation point so as to be rotatable relative to the luggage compartment and which comprises a first section, with a first end which is configured for the mounting of the luggage compartment flap thereon, and a second section. The mounting arm serves for the fastening of the luggage compartment flap and for the movement of the luggage compartment flap, for example from a closed position to an open position and vice versa. Here, the articulation point may be provided on a side wall of the associated luggage compartment. For example, a hinge or some other joint may be provided on the side wall for the rotatable fastening of the mounting arm.

Alternatively or in addition, the articulation point may also be provided on a structure which is independent of the luggage compartment. For example, a hinge or some other joint may be provided on a primary structure of the vehicle, on an installation rail or on a similar holding means for the rotatable fastening of the mounting arm.

Furthermore, the movement device may comprise an actuator which is coupled to the second section of the mounting arm. This may be, in particular, an electric actuator. The electric actuator effects a movement of a part of the actuator when an electrical potential is applied to an active element of the actuator and/or an electrical current flows through the active element of the actuator.

A coupling between actuator and mounting arm may be realized by fastening of a part of the actuator to the mounting arm or by contact between actuator and mounting arm (in particular at the second section of the mounting arm). Direct and indirect coupling between actuator and mounting arm is also encompassed by the present disclosure. A direct coupling provides a direct fastening or direct contact of the actuator (in particular an active element of the actuator) and the mounting arm. An indirect coupling comprises one or more intermediate elements that are arranged so as to act mechanically between the mounting arm and the actuator (in particular an active element of the actuator).

Furthermore, the actuator may be configured to, when activated, move the mounting arm by way of the second section of the mounting arm such that the luggage compartment flap is moved at least part of the way from an open position to a closed position. A luggage compartment flap is normally pivoted upward when it is moved into its open position. In particular, a free end, situated opposite the articulation point and mounting arm, of the luggage compartment flap is moved upward in the process. The actuator can then move the luggage compartment flap from its open position in the direction of a closed position. The actuator and its coupling to the mounting arm serves, in particular, only for the movement of the luggage compartment flap from the open position, in which the luggage compartment flap is more difficult to reach owing to its high position, in the direction of the closed position, such that the luggage compartment flap is easier to reach. Complete closure of the luggage compartment flap is then possible manually, as is also the case with known luggage compartment flaps.

In particular, in the case of large luggage compartments with a large luggage compartment flap, which in its open position is arranged almost at the ceiling of a vehicle cabin, the movement caused by the actuator is helpful in order to facilitate the closing of the luggage compartment flap. Depending on the height of the luggage compartment flap in its open position (in relation to a vehicle floor or vehicle cabin floor), it is sufficient to move the luggage compartment flap downward by a few centimeters (approximately 5 to 35 cm) such that it is easier to reach and can be operated by hand. A small rotational movement about the articulation point, for example between 2° and 20°, preferably between 5° and 15°, is sufficient to move the free end of the luggage compartment flap downward by a few centimeters.

Since no cumbersome closing mechanism is provided for moving the luggage compartment flap all the way into its closed position, a small and lightweight actuator can be used. Furthermore, a small and lightweight actuator can also be retrofitted in existing luggage compartments and on existing luggage compartment flaps.

In one implementation variant, the movement device may furthermore comprise a sensor element which is configured to receive an activation signal and activate the actuator. The sensor element can thus apply an electrical potential to an active element of the actuator in order to activate the latter. For example, the sensor element may close an electrical current circuit in which the active element of the actuator is integrated. For this purpose, the sensor element may close a relay or some other switching element of an electrical current circuit.

In a further implementation variant, the sensor element may be configured to receive the activation signal via a wireless interface and/or a wired interface. For example, the wireless interface may be a receiver for a wireless signal. An infrared receiver, a radio signal receiver (RF receiver), a network receiver (for example Bluetooth or WLAN) and a near-field communication receiver (NFC receiver) are mentioned here merely by way of example. These forms of the sensor element allow an activation of the actuator from a distance, for example from a radio-based remote controller or from a central control panel. Furthermore, in the case of a multiplicity of luggage compartments in a vehicle, several or all luggage compartment flaps can be controlled simultaneously, that is to say, simultaneously moved downward for easier closing.

Alternatively or in addition, the wireless interface may be implemented by means of radio frequency identification (RFID) sensors/receivers, which likewise allows wireless activation of the actuator. However, a corresponding RFID chip/transmitter must be brought into the vicinity of the sensor element, whereby an inadvertent activation of the actuator and thus possible risks of injury owing to luggage compartment flap(s) situated at a low height are avoided.

A wired interface likewise allows central control of one or more luggage compartment flaps of a multiplicity of luggage compartments in a vehicle. Furthermore, the wired interface also allows a supply of electrical current to the electric actuator.

In another implementation variant, the second section of the mounting arm may be situated closer to the articulation point than the first section of the mounting arm. In other words, the articulation point, the second section, the first section and the fastened luggage compartment flap lie along a longitudinal axis of the mounting arm.

In a yet further implementation variant, the second section of the mounting arm may be situated opposite the first section of the mounting arm with respect to the articulation point. In other words, the articulation point is arranged in a central region of the mounting arm, the first section of the mounting arm being situated on one side of the articulation point and the second section of the mounting arm being situated on the other side of the articulation point. Here, "opposite" does not mean an exact elongation of the first section beyond the articulation point, but may also encompass a bend. In other words, a longitudinal axis of the first section of the mounting arm may enclose an angle not equal to 180° with a longitudinal axis of the second section of the mounting arm. Furthermore, the second section of the mounting arm may constitute a cantilever, that is to say, the second section of the mounting arm has a free end on a side averted from the articulation point. The first section of the mounting arm duly also has a free end on a side averted from the articulation point, but the luggage compartment flap is mounted there.

In one implementation variant, the actuator may be an electromagnetic actuator and may comprise a movable pin. Here, the movable pin may be coupled to a magnet, which moves under the influence of an electromagnetic field, of the electromagnetic actuator. For example, the movable pin may be fixedly connected to the moving magnet. The moving magnet is either a permanent magnet or an electromagnet. If a permanent magnet is used, sliding contacts or movable electrical contacts can be avoided. Here, the actuator may comprise an electromagnet which is provided in a fixed position in the actuator and which repels or attracts the permanent magnet when the electromagnet is electrically activated. This movement can be transmitted via the movable pin to the mounting arm.

In a similar implementation variant, the actuator may be an electromagnetic actuator and may comprise a movable pin. Here, the electromagnetic actuator is configured as a linear motor, a movement axis of the linear motor corresponding or being parallel to a longitudinal axis of the movable pin. Furthermore, the movable pin may be part of the linear motor, whereby a compact design is made possible.

Alternatively, the actuator may be an electric motor which sets a shaft in rotation. Here, the rotational movement of the shaft can be used to move the movable pin or a similar element that is coupled to the mounting arm. It is likewise alternatively possible for the shaft of the motor to be mechanically coupled to the mounting arm in order to move the mounting arm, such that the luggage compartment flap is moved at least part of the way from its open position to its closed position.

In an alternative implementation variant, the actuator may be a piezo actuator and may optionally comprise a movable pin. Here, the movable pin may be coupled to a piezoelectric element of the piezo actuator. For example, the movable pin may be fixedly connected to the piezoelectric element. The piezoelectric element undergoes an increase in volume when it is electrically activated, that is to say, when a voltage is connected to the piezoelectric element. If one side of the piezoelectric element is arranged in a fixed position in the actuator and the movable pin is arranged on the opposite side, then the movable pin can be moved by application of the voltage to the piezoelectric element. This movement can be transmitted via the movable pin to the mounting arm. Here, by means of a fixed connection to the piezoelectric element, the movable pin may also be moved back again when the voltage is withdrawn. Alternatively or in addition, it is also possible for a spring element to be provided which moves the movable pin back into an initial position (in this case to the electrical element without voltage). The piezo actuator may self-evidently also make direct contact with the mounting arm, in particular with the second section of the mounting arm, and move the latter when the voltage is applied.

In a general implementation variant, the actuator or the movable pin may comprise a hydraulic element in order to boost a movement of the actuator. The hydraulic element thus offers an indirect coupling between the active element of the actuator and the mounting arm and/or between the active element of the actuator and the movable pin. The hydraulic element may be configured such that a small movement of the active element of the actuator is boosted into a larger movement of the mounting arm and/or movable pin.

The actuator with or without movable pin makes it possible for a pressure force to be exerted on the second section of the mounting arm, the pressure force causing a movement of the luggage compartment flap in the direction of its closed position. Here, the actuator or the movable pin may be arranged such that the second section of the mounting arm first makes contact with the actuator or movable pin when the luggage compartment flap is in its open position. Thus, the movement of the luggage compartment flap between the open position and the closed position or vice versa is entirely free from the (inactive) actuator. Only when it is sought to facilitate the closing of the luggage compartment flap by means of an activated actuator can the latter be coupled via the second section of the mounting arm to the luggage compartment flap and move the luggage compartment flap.

In one implementation variant, the actuator may be arranged in operative connection with a damper, the damper dampening a movement of the luggage compartment flap from its closed position to its open position and optionally stopping the movement when the open position is reached. Such dampers are already provided in conventional joint arrangements for luggage compartment flaps in order to prevent the luggage compartment flap from abutting against a ceiling of a vehicle cabin. Normally, luggage compartment flaps are assisted or driven in terms of their movement from the closed position to the open position by means of a spring element, for example a rotary spring, such that the damper dampens the movement at the end (a short distance before the open position) and possibly ends the movement. For example, the second section of the mounting arm may make contact with the damper when the luggage compartment flap reaches its open position or shortly before this, in order to realize a sufficient damping distance. The actuator may then be arranged between the damper and the second section of the mounting arm. Alternatively, the actuator could also be arranged at a side of the damper situated opposite the mounting arm. Alternatively or in addition, the movable pin may be arranged through the damper or arranged as a cylinder or similar hollow component around the damper. In any case, this allows a compact and easily verifiable implementation of the movement device.

In a further implementation variant, the actuator may be an electroactive polymer actuator. For example, the actuator may comprise a conductive polymer, an ionic metal-polymer compound, such as, for example, an electrostrictive or ferroelectric polymer, or a dielectric elastomer. Such a polymer actuator is particularly lightweight. The electroactive polymer is distinguished by the fact that it contracts when a voltage is applied. The traction forces that can thus be generated can be transmitted to the mounting arm, such that the luggage compartment flap can be moved in the direction of its closed position. For example, the polymer actuator may be fixedly connected in each case to the second section of the mounting arm and to a positionally fixed point (for example on the luggage compartment or on a primary structure or the like), the electroactive polymer expanding when the luggage compartment flap moves from its closed position to its open position and the second section of the mounting arm performing a corresponding rotational movement about the articulation point. If a voltage is now applied to the electroactive polymer, it is possible, by means of a reversed rotational movement, for the luggage compartment flap to be at least partially closed again and thus made easier to reach.

According to a further aspect for improved understanding of the present disclosure, a luggage compartment for a vehicle comprises at least one movement device according to the first aspect. For example, the luggage compartment may comprise a single movement device which has an actuator which is strong enough to move the luggage compartment flap. It is likewise possible for one or more movement devices to be provided for each articulation point of the luggage compartment flap. For example, a luggage compartment flap may comprise two or three mounting arms, at least one of which is equipped with one or more movement devices.

According to a yet further aspect for improved understanding of the present disclosure, a vehicle region comprises a multiplicity of luggage compartments according to the further (second) aspect. Furthermore, the vehicle region comprises a controller which is configured to transmit an activation signal selectively to one or several of the multiplicity of luggage compartments in order to activate the respective actuator. Here, the controller may be a remote controller which is arranged in the vehicle region. The controller may likewise be a control panel for the control of various components of the vehicle, wherein the controller comprises a user interface (buttons, keys or other input means) for activating one or more actuators.

According to another aspect for improved understanding of the present disclosure, a vehicle comprises at least one movement device according to the first aspect. Alternatively or in addition, the vehicle may comprise at least one luggage compartment according to the further (second) aspect.

Furthermore, the above-described aspects, implementation variants and examples may self-evidently be combined, without this being explicitly described. Each of the described implementation variants is thus to be regarded as optional with regard to each of the aspects, configurations and variants or even combinations thereof. The present disclosure is also not limited to the individual configurations and implementation variants in the sequence described, or to a particular combination of the aspects and implementation variants.

BRIEF DESCRIPTION OF THE DRAWINGS

Preferred exemplary embodiments of the invention will now be explained in more detail with reference to the appended schematic drawings, in which.

DETAILED DESCRIPTION OF THE PREFERRED EMBODIMENTS

Figure 1:
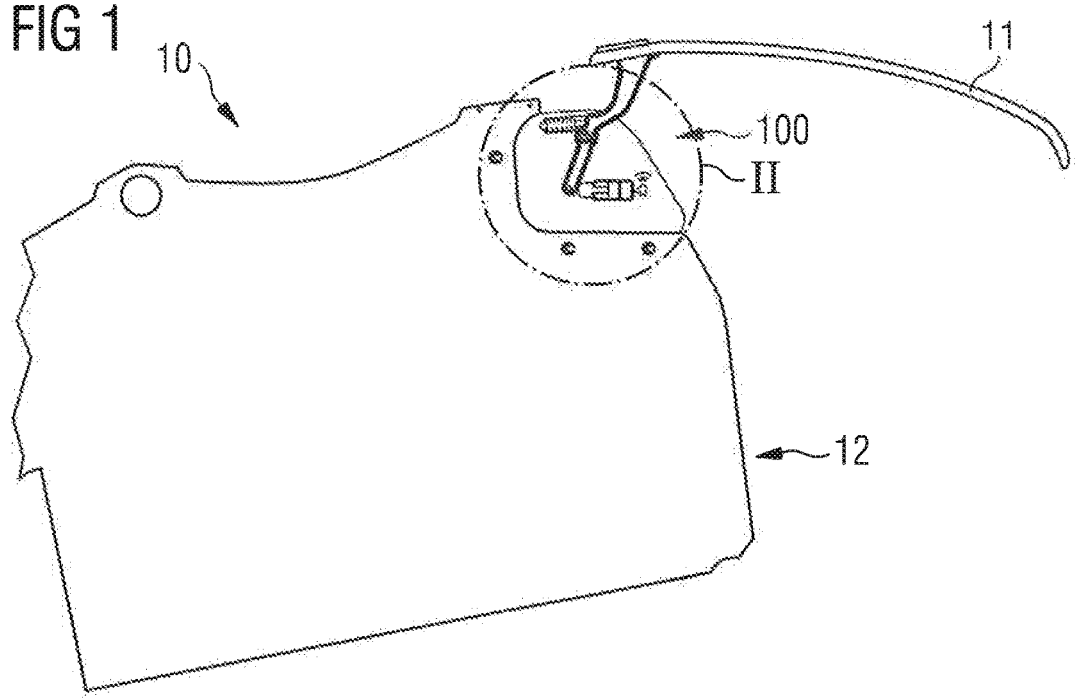
FIG. 1 shows a schematic side view of a luggage compartment.

FIG. 1 shows a schematic side view of a luggage compartment 10. The luggage compartment 10 has an opening 12 through which luggage or other articles can be placed into the luggage compartment 10. In order to prevent the articles from falling out of the luggage compartment 10, the opening 12 is closed by means of a luggage compartment flap 11. FIG. 1 shows the luggage compartment flap 11 in an open position, such that luggage and the like can be placed into the luggage compartment 10, or removed, through the opening 12.

Figure 5:
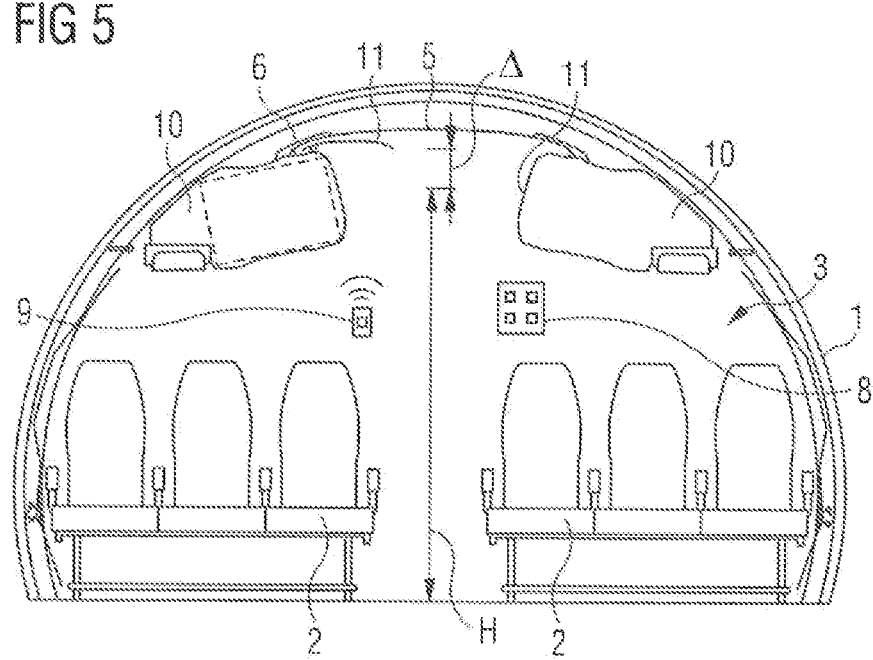
FIG. 5 schematically shows a vehicle region in the form of a sectional view of a vehicle.

With regard to FIG. 5, the arrangement of such a luggage compartment 10 in an aircraft region 3 is shown. Luggage compartments 10 are normally arranged above rows of seats 2 in a vehicle 1, wherein persons can stand in an aisle between the rows of seats 2. If the luggage compartment flap 11 is now moved into its open position, as shown on the left in FIG. 1 and in FIG. 5, the free end of the luggage compartment flap 11 may be situated so high up that it is no longer reached by a person. A movement device 100 now allows a movement of the luggage compartment flap 11 at least part of the way from its open position in the direction of its closed position, such that the free end of the luggage compartment flap 11 is moved downward to a particular extent Δ. As a result, the luggage compartment flap 11 is situated at a height H, at which it can normally be reached by a person with an outstretched hand. The height H may lie between 1.80 m and 2.10 m, preferably between 1.90 m and 2.05 m, and may, particularly preferably, be approximately 1.97 m. Here, the extent Δ to which the luggage compartment flap 11 is moved downward may be between 5 cm and 35 cm, preferably between 15 cm and 30 cm, and particularly preferably between 20 cm and 25 cm.

Figure 2:
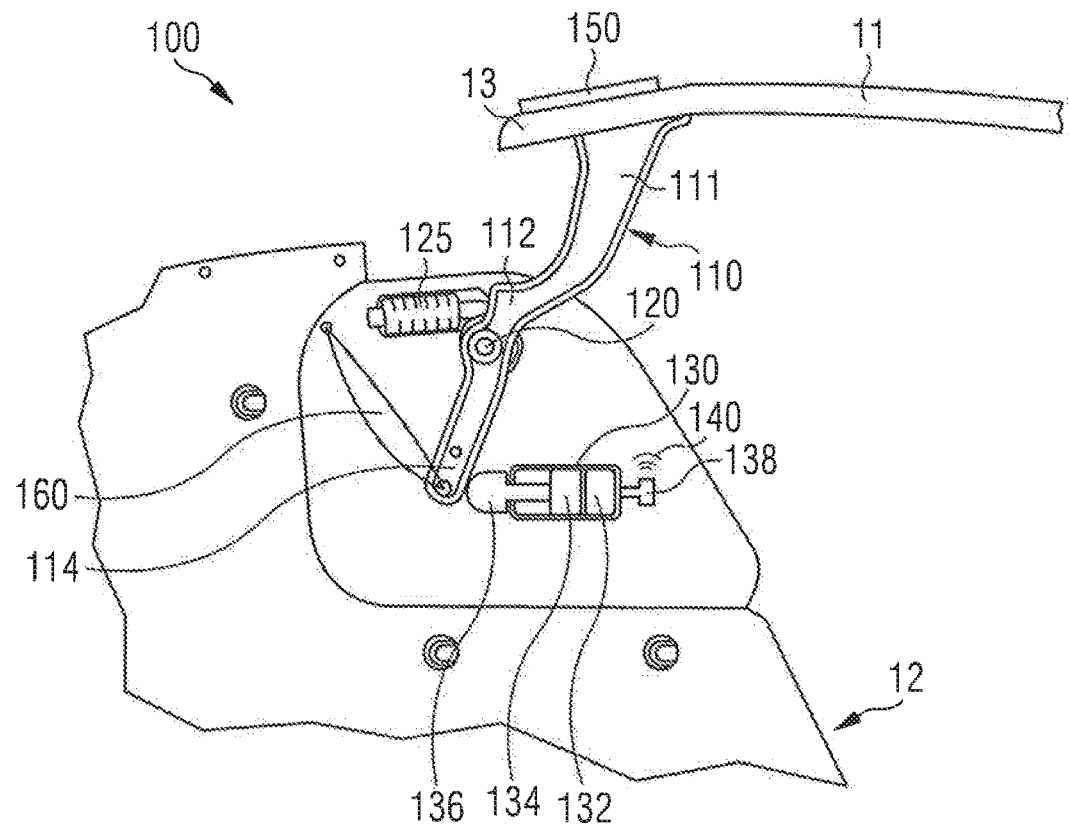
FIG. 2 schematically shows a detail of the luggage compartment from FIG. 1.

FIG. 2 schematically shows a detail, in particular a movement device 100, of the luggage compartment 10 from FIGS. 1 and 5. The movement device 100 comprises a mounting arm 110 which is articulated at an articulation point 120 so as to be rotatable relative to the luggage compartment 10. For example, the mounting arm 110 may be fastened to a rotary joint at the articulation point 120. The luggage compartment flap 11 is mounted (fastened) on a first section 111 of the mounting arm 110. In particular, the luggage compartment flap 11 is fastened by way of its upper end 13 to the mounting arm 110, which upper end is arranged at the upper end of the luggage compartment 10 when the luggage compartment flap 11 is in the closed position (see the right-hand side of FIG. 5).

The mounting arm 110 furthermore comprises an actuator 130, 160 which is coupled to a second section 114 of the mounting arm 110. In FIG. 2, the second section 114 of the mounting arm 110 is arranged so as to be situated opposite the first section 111 of the mounting arm 110 with respect to the articulation point 120. That part of the mounting arm 110 which is designated as section 112 may likewise be used/regarded as second section 112 of the mounting arm 110 for coupling to the actuator 130, 160, as will be discussed in more detail further below.

The electromagnetic actuator 130 illustrated by way of example in FIG. 2 may comprise a movable pin 136. The movable pin 136 is moved by a magnet 134 under the influence of an electromagnetic field. For this purpose, the magnet 134 and the movable pin 136 are mechanically coupled, for example are fixedly connected to one another. The electromagnetic field may be generated by means of an electromagnet 132 by way of an electrical current, such that a permanent magnet 134 can be repelled by the electromagnet 132.

Figure 3:
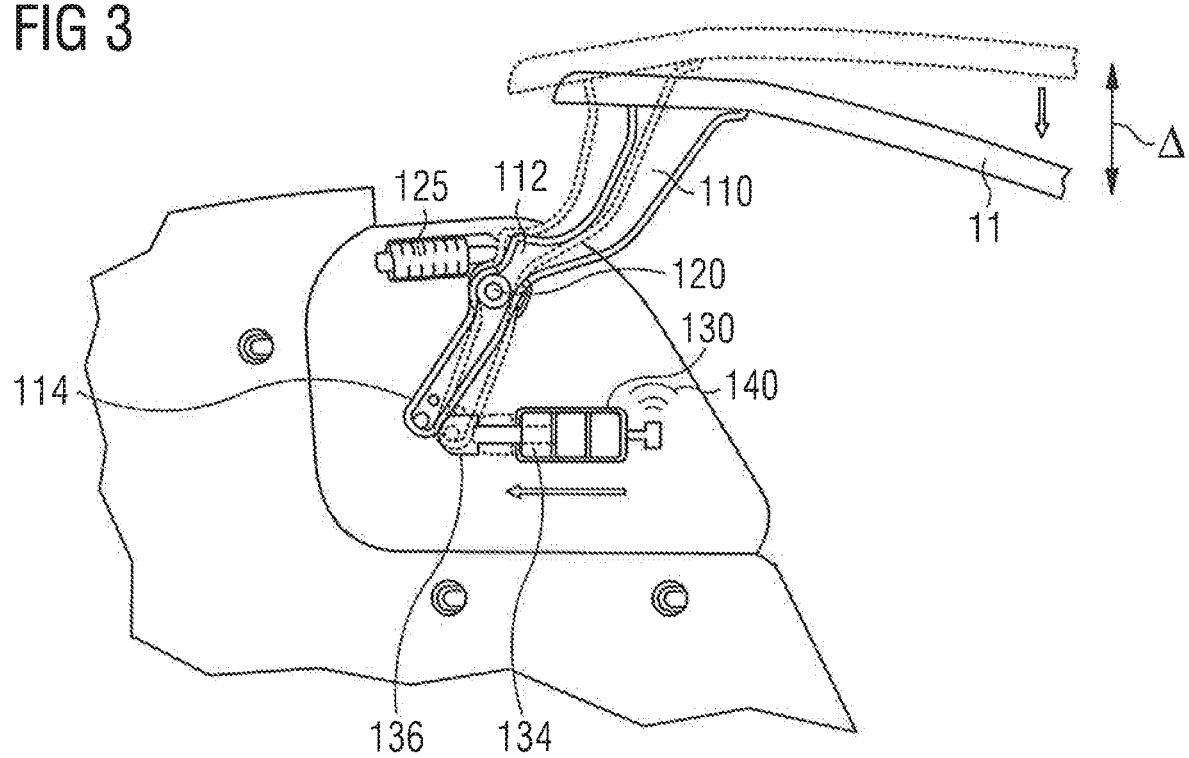
FIG. 3 schematically shows the detail from FIG. 2 upon activation of a movement device.
Figure 4:
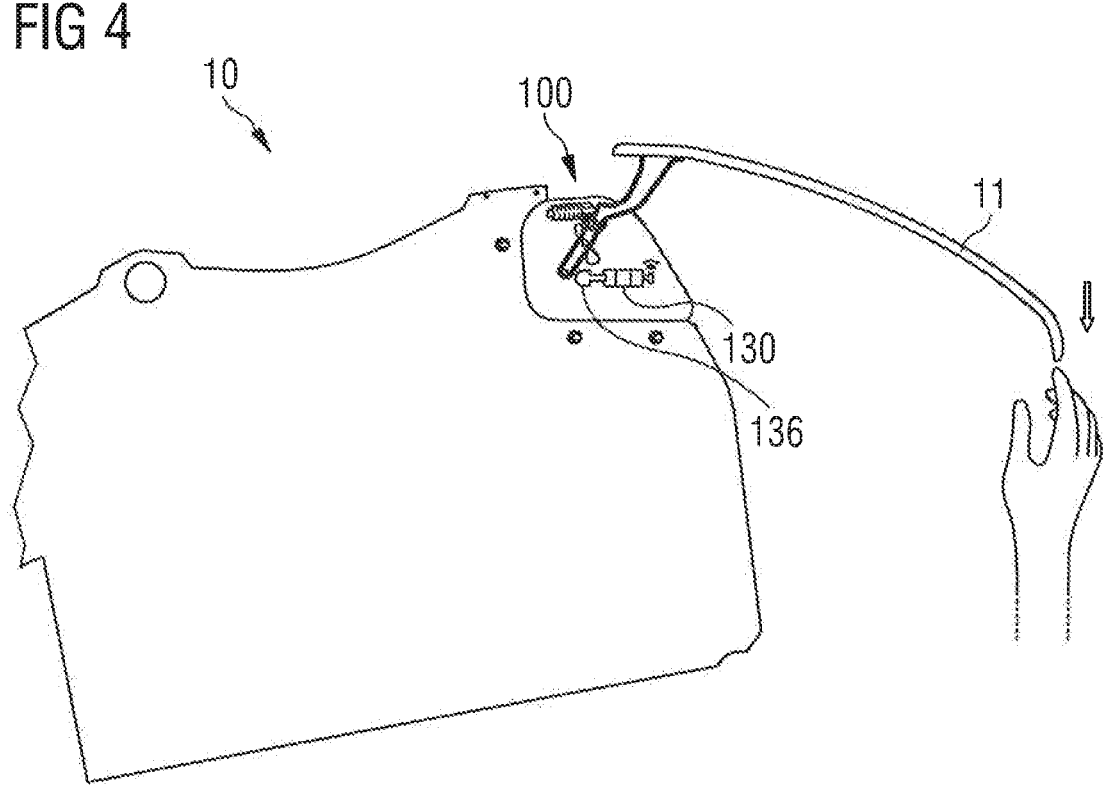
FIG. 4 schematically shows the luggage compartment from FIG. 1 upon activation of a movement device.

This movement, illustrated in FIG. 3, resulting from repulsion of the magnet 134 by the electromagnet 132 has the effect that the movable pin 136 likewise moves the second section 114 of the mounting arm 110. Here, the mounting arm 110 rotates about the articulation point 120, such that the luggage compartment flap 11 fastened on the mounting arm 110 is moved at least part of the way from its open position (illustrated by dashed lines in FIG. 3) to its closed position. A free end of the luggage compartment flap 11 (not illustrated in its entirety in FIGS. 2 and 3), the free end being situated opposite the upper end 13, moves downward to the extent Δ, whereby the free end is easier to reach, as illustrated in FIG. 4. The luggage compartment 10 can now be easily closed by virtue of the luggage compartment flap 11 being moved manually into its closed position, as shown by way of example on the right-hand side in FIG. 5.

The coupling between second section 114 and movable pin 136 may be realized merely by way of contact between the two elements, such that the second section 114 of the mounting arm 110 now moves away from the movable pin 136.

Referring again to FIGS. 2 and 3, the movement device 100 may also have a piezo actuator 130 instead of an electromagnetic actuator 130. The piezo actuator effects the same movement as the electromagnetic actuator, but the movement of the movable pin 136 takes place as a result of an expansion of a piezoelectric element in the actuator 130 from the position shown in FIG. 2 to the position shown in FIG. 3.

In FIG. 2, the movement device 100 is furthermore illustrated with an actuator 160, which is optional (or an alternative to the actuator 130). The actuator 160 may be an electroactive polymer actuator 160 which contracts when an electrical voltage is applied. The polymer actuator 160 is therefore arranged on the opposite side of the second section 114 in order, by way of its pulling forces, to effect the movement of the mounting arm 110 and thus of the luggage compartment flap 11 as illustrated in FIGS. 2 and 3. When the luggage compartment flap 11 is situated in its closed position, the second section 114 has been rotated about the articulation point 120 such that the free end of the second section is situated further to the left and in particular further upward. Here, the polymer actuator 160 may hang downward in a slack manner or may alternatively be of elastic configuration such that it contracts (when an electrical voltage is not applied).

The luggage compartment 10 or the movement device 100 may furthermore comprise a damper 125. During the opening of the luggage compartment flap 11, a section 112 of the mounting arm 110 may make contact with a part of the damper 125. For example, the damper 125 may be implemented in the form of a spring element and/or a hydraulic or pneumatic damping piston. The damper 125 is intended to prevent the luggage compartment flap 11 from abutting against a ceiling element 5 (see FIG. 5).

Since the coupling between section 112 of the mounting arm 110 and damper 125 likewise first occurs in the open position of the luggage compartment flap 11, the actuator 130 may also be implemented in conjunction with the damper 125. For example, the actuator may be arranged between the damper 125 and the section 112 of the mounting arm 110. Alternatively, the actuator may be arranged at an end of the damper 125 which is shown on the left in FIG. 2. In both cases, the movement of the actuator 130 is transmitted to the (in this case second) section 112 of the mounting arm 110 such that the luggage compartment flap 11 is moved downward to the extent Δ.

Irrespective of the type of actuator 130, 160 that is used, the actuator may have an adjustment device 138. For example, the adjustment device 138 may be implemented in the form of a screw by means of which the actuator 130, 160 or the movable pin 136 can be moved into a basic position which corresponds to the situation of the second section 114 of the mounting arm 110 when the luggage compartment flap 11 is in the open position. A "basic position" means a position in which the actuator 130, 160 is coupled without play to the mounting arm 110 and, when a voltage is applied, the actuator immediately exerts a force on the second section 114 of the mounting arm 110 and thus moves the latter.

The movement device 100 furthermore comprises a sensor element 140 which is configured to receive an activation signal and activate the actuator 130, 160. The activation of the actuator 130, 160 is performed, for example, by application of a voltage to the electromagnet 132, piezoelectric actuator 130 or the electroactive polymer actuator 160. To receive the activation signal, the sensor element 140 may comprise a wireless interface and/or a wired interface (not separately illustrated). The activation signal may originate from a controller, for example a wired controller 8 and/or a wireless controller 9 (see FIG. 5). The wireless controller 9 may be utilized in the form of a remote controller in the vehicle region 3. By contrast, the wired controller 8 may be fixedly installed in the vehicle region 3, for example together with further control elements.

A wired interface of the sensor element 140 may furthermore be used to supply electrical current to the movement device 100 and, in particular, to the actuator 130, 160 and the sensor element 140. Alternatively or in addition, an illumination means (not separately illustrated) of the interior space of the luggage compartment 10 can likewise be supplied with electrical current. Existing electrification of the luggage compartment 10 or of some other component in the vicinity of the movement device 100 may self-evidently also be used in order to supply electrical current to the movement device 100.

An alternative supply of electrical current may be implemented, for example, by means of a solar cell 150 (see FIG. 2). Such a solar cell 150 may be arranged, for example, at the upper end 13 of the luggage compartment flap 11. The upper end 13 of the luggage compartment flap 11 is, in the opened state (open position) of the luggage compartment flap 11, arranged in a region of the ceiling element 5, on which an illumination means 6 of the interior space of the vehicle 1 is commonly situated (see FIG. 5). Since the luggage compartment flap 11, in its open position, partially conceals the illumination means 6 and the light of the illumination means 6 is not fully available for the interior space of the vehicle 1, it can be easily used for the supply of electrical current to the actuator 130, 160. The electrical current demand of the actuator 130, 160 is, on the one hand, very low and is, on the other hand, limited in terms of time, because the lowering of the luggage compartment flap 11 is normally required only for a short time. Furthermore, the actuator 130, 160 requires electrical current only when the luggage compartment flap 11 is in its open position, and thus the solar cell 150 is arranged directly under the illumination means 6.

The exemplary embodiments and variants described above serve merely for illustrating the invention. All examples, variants and individual details may be combined with one another as desired in order to form particular embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A movement device for a luggage compartment flap, the movement device comprising:
   a mounting lever arm which is configured to be articulated at a stationary articulation point to be rotatable relative to a luggage compartment and which comprises a first section, with a first end which is configured for the mounting of the luggage compartment flap thereon, and a second section, wherein the stationary articulation point is located between the first section and the second section,
   an actuator which is coupled to the second section of the mounting lever arm, and which causes the mounting lever arm to be articulated at the stationary articulation point,
      the actuator being configured to, when activated, move the mounting lever arm by way of the second section of the mounting lever arm such that a free end of the luggage compartment flap is moved no more than a downward extent from an open position towards a closed position,
      wherein the downward extent is less than a downward distance necessary for placing the luggage compartment flap in the closed position.

2. The movement device as claimed in claim 1, furthermore comprising a sensor element which is configured to receive an activation signal and activate the actuator.

3. The movement device as claimed in claim 2, the sensor element being configured to receive the activation signal via at least one of a wireless interface or a wired interface.

4. The movement device as claimed in claim 1, the second section of the mounting lever arm being situated opposite the first section of the mounting lever arm with respect to the stationary articulation point.

5. The movement device as claimed in claim 1, the actuator being an electromagnetic actuator and comprising a movable pin, and the movable pin being coupled to a magnet, which moves under an influence of an electromagnetic field, of the electromagnetic actuator.

6. The movement device as claimed in claim 1, the actuator being a piezo actuator and comprising a movable pin, and the movable pin being coupled to a piezoelectric element of the piezo actuator.

7. The movement device as claimed in claim 5, the actuator comprising a hydraulic element in order to boost a movement of the actuator.

8. The movement device as claimed in claim 6, the movable pin comprising a hydraulic element in order to boost a movement of the actuator.

9. The movement device as claimed in claim 1, the actuator being an electroactive polymer actuator.

10. A luggage compartment for a vehicle, comprising the movement device as claimed in claim 1.

11. A vehicle region, comprising:
   a plurality of luggage compartments, each luggage compartment comprising a corresponding movement device according to the movement device as claimed in claim 1; and
   a controller which is configured to transmit an activation signal selectively to one or several of the plurality of luggage compartments to activate the respective actuator.

12. A vehicle having the movement device as claimed in claim 1.

13. A vehicle having the luggage compartment as claimed in claim 10.

* * * * *